United States Patent
Hashimoto et al.

(10) Patent No.: US 6,507,371 B1
(45) Date of Patent: *Jan. 14, 2003

(54) COMMUNICATION APPARATUS AND METHOD THAT LINK A NETWORK ADDRESS WITH DESIGNATED IMAGE INFORMATION

(75) Inventors: Yasuhiko Hashimoto, Yokohama (JP); Hiroshi Ohwada, Yokohama (JP); Makoto Takaoka, Yokohama (JP); Shigeki Yamada, Yokohama (JP); Shigetada Kobayashi, Tokyo (JP); Kiyoshi Kusama, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,221

(22) Filed: Apr. 15, 1997

(30) Foreign Application Priority Data

Apr. 15, 1996 (JP) .................................. 8-092472
Apr. 14, 1997 (JP) .................................. 9-095830

(51) Int. Cl.[7] .................... H04N 7/00; G08G 1/123; G06F 15/16
(52) U.S. Cl. .................... 348/552; 340/988; 709/245; 348/207.1
(58) Field of Search ................ 348/231, 232, 348/233, 334, 552; 396/429, 310, 311, 315, 319; 370/389, 392; 379/90.01, 93.01; 340/825.49, 988; 709/218, 245, 246

(56) References Cited

U.S. PATENT DOCUMENTS

| | | | | |
|---|---|---|---|---|
| 4,827,347 A | * | 5/1989 | Bell | 348/333 |
| 5,095,480 A | * | 3/1992 | Fenner | 370/392 |
| 5,296,884 A | * | 3/1994 | Honda et al. | 396/311 |
| 5,335,072 A | * | 8/1994 | Tanaka et al. | 348/232 |
| 5,506,644 A | * | 4/1996 | Suzuki et al. | 396/310 |
| 5,742,339 A | * | 4/1998 | Wahue | 348/233 |
| 5,781,773 A | * | 7/1998 | Vanderpool et al. | 395/611 |
| 5,793,630 A | * | 8/1998 | Theimer et al. | 340/825.49 |
| 5,845,227 A | * | 12/1998 | Peterson | 701/209 |
| 5,893,091 A | * | 4/1999 | Hunt et al. | 707/3 |
| 5,926,116 A | * | 7/1999 | Kitano et al. | 340/988 |
| 5,974,386 A | * | 10/1999 | Ejima et al. | 704/276 |
| 5,978,016 A | * | 11/1999 | Lauretle et al. | 348/231 |
| 6,065,015 A | * | 5/2000 | Kazani | 707/104 |

* cited by examiner

Primary Examiner—Wendy R. Garber
Assistant Examiner—Rashawn N. Tillery
(74) Attorney, Agent, or Firm—Fitzpatrick, Cella, Harper & Scinto

(57) ABSTRACT

To make it possible to process or retrieve a recorded image in accordance with the location where the image is recorded and record digital image data together with GPS information when capturing a digital image by a video camera. Moreover, when GPS information cannot be captured, GPS information of a certain time before is captured. Furthermore, a system is disclosed which accesses the internet in accordance with the captured GPS information.

27 Claims, 17 Drawing Sheets

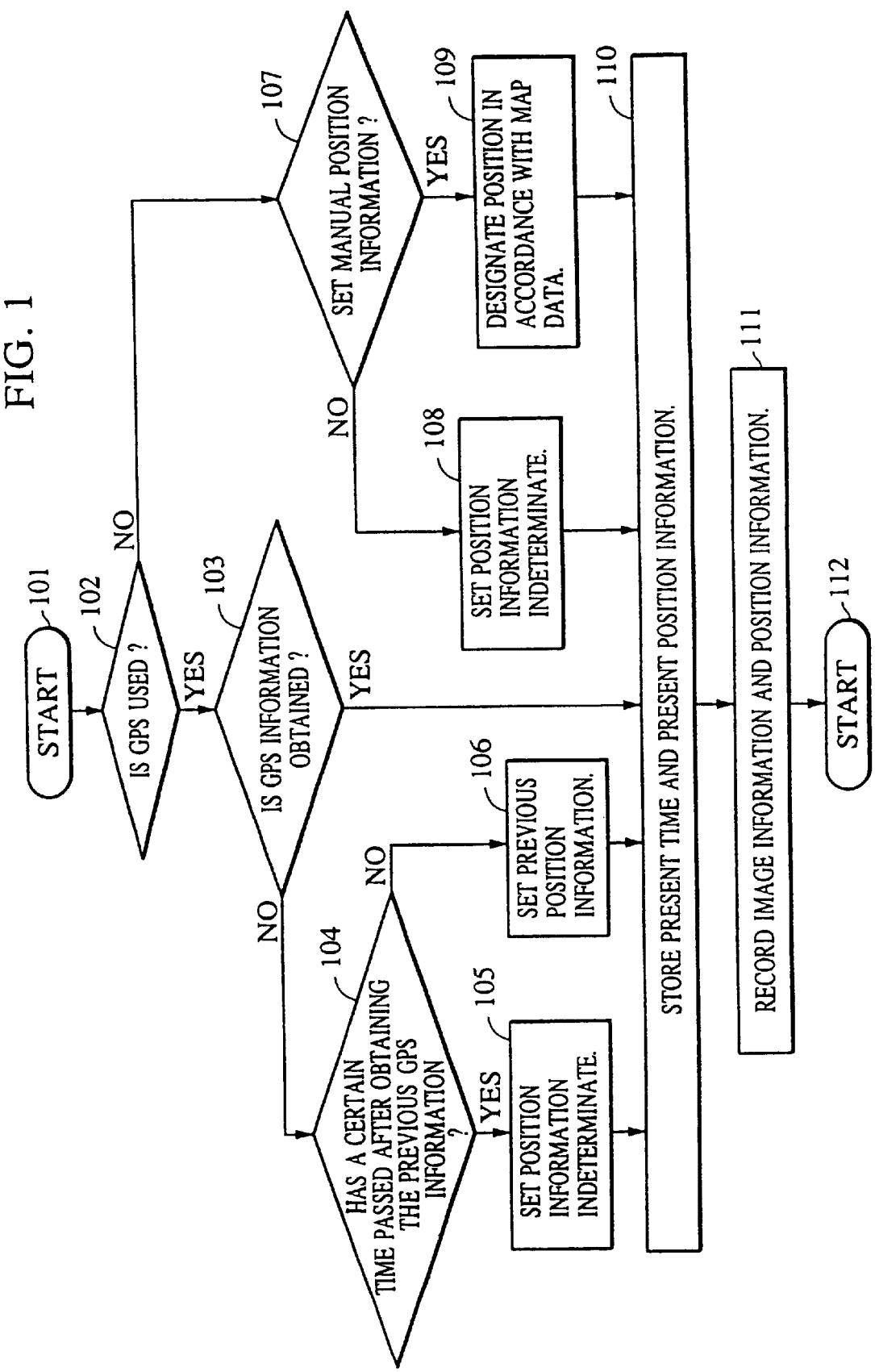

IMAGE DISPLAY SCREEN

DIGITAL CAMERA WITH GPS (35° 11', 138° 52') ← (YOKOHAMA) ← (KAMAGAWA) ← (KANTO) ← (JAPAN)

DISPLAY FLOW

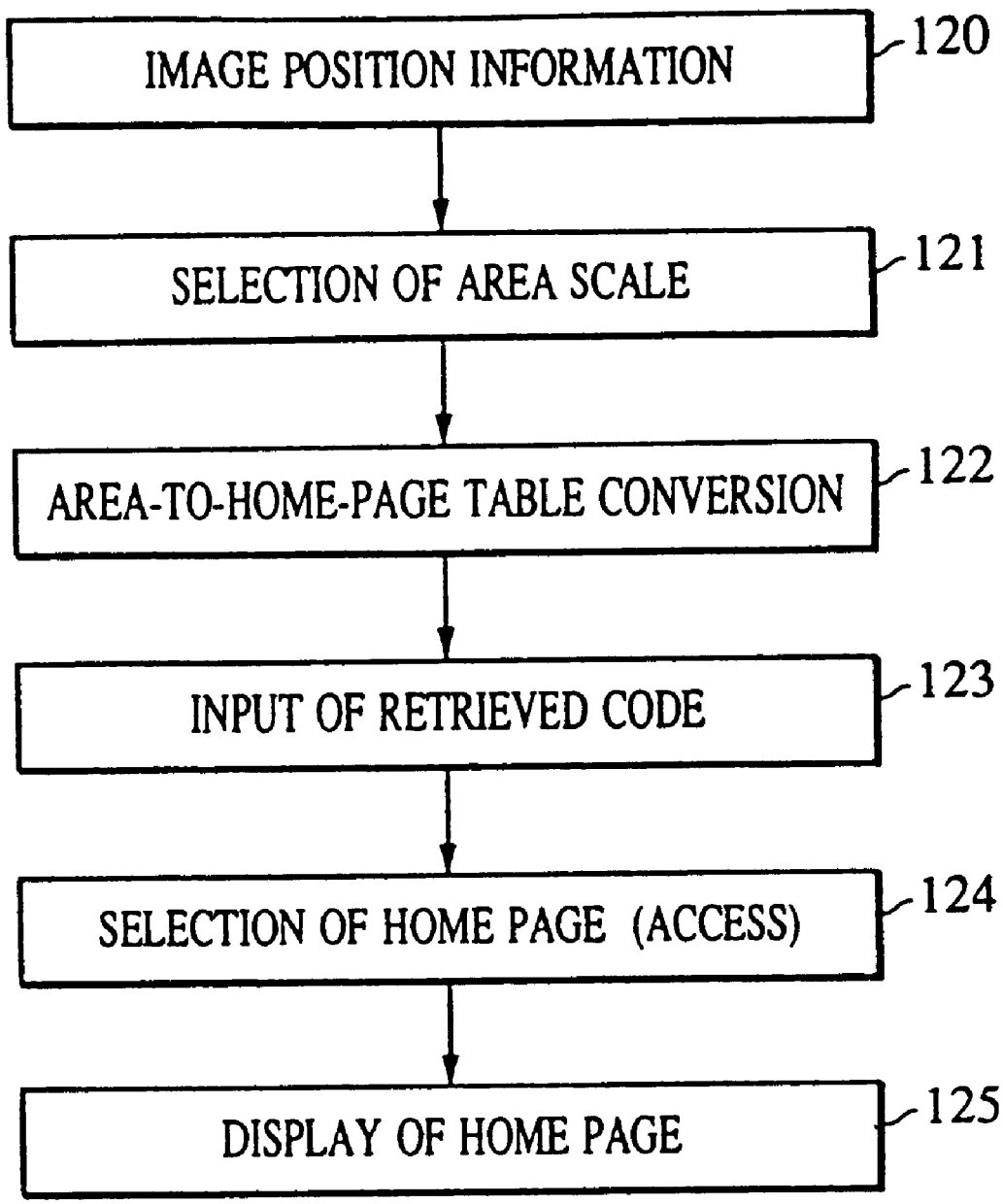

DISPLAY SCREEN

MAP SCALE CHANGE SCREEN

HOME PAGE OF YOKOHAMA

HOME PAGE OF YOKOHAMA JIDOSHA

FIG. 8
AREA CLASSIFICATION

GROUP A (COUNTRIES)
① JAPAN
② AMERICA
③ BRITAIN
④ FRANCE
⑤ GERMANY
⑥ CHINA
⑦ KOREA
⋮

GROUP B (DISTRICTS)
① KANTO DISTRICT
② CHUBU
③ KINKI
④ TOHOKU
⑤ HOKKAIDO
⑥ CHUGOKU
⑦ KYUSHU
⑧ SHIKOKU

GROUP C (TO, DO, FU, AND PREFECTURES)
① TOKYO METROPOLIS
② KANAGAWA PREFECTURE
③ SAITAMA PREFECTURE
④ CHIBA PREFECTURE
⑤ GUNMA PREFECTURE
⑥ TOCHIGI PREFECTURE
⋮

GROUP D (SITIES)
① YOKOHAMA CITY
② KAMAKURA CITY
③ YOKOSUKA CITY
④ KAWASAKI CITY
⑤ ATSUGI CITY
⋮

GROUP E (WARDS)
① NISHI WARD
② KANAGAWA WARD
③ TSURUMI WARD
④ ISOGO WARD
⑤ MINATO WARD
⋮

FIG. 9A
ROUGH CLASSIFICATION (RECTANGULAR REGION OF AREA)
FOR TO, DO, FU, AND PREFECTURES
    TOKYO METROPOLIS    ( 35° 53', 138° 56' ) ~ ( 35° 30', 139° 55' )
    KANAGAWA PREFECTURE    ( 35° 39', 138° 56' ) ~ ( 35° 07', 140° 52' )
..................................................................................................................................................
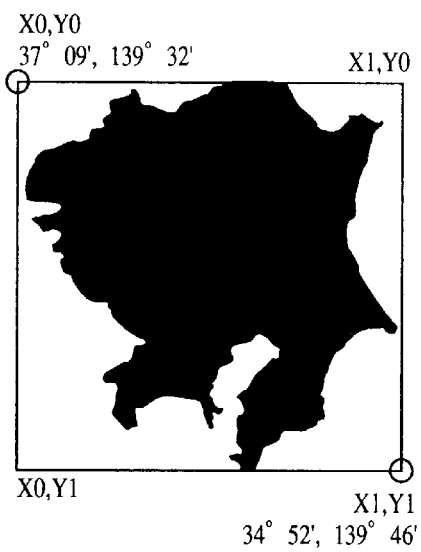
(a) KANTO DISTRICT
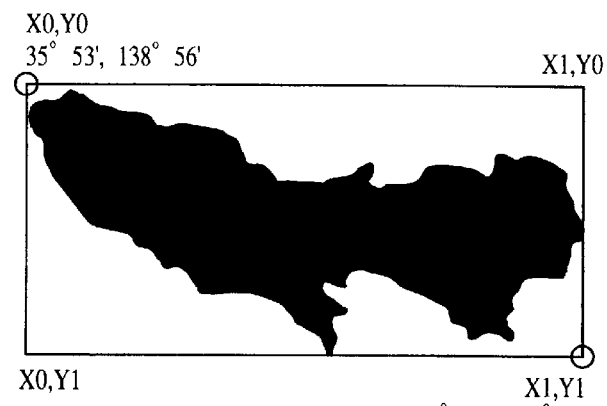
(b) TOKYO METROPOLIS
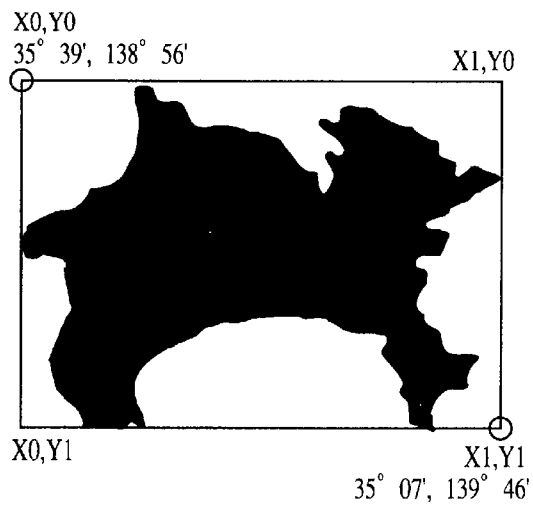
(c) KANAGAWA PREFECTURE
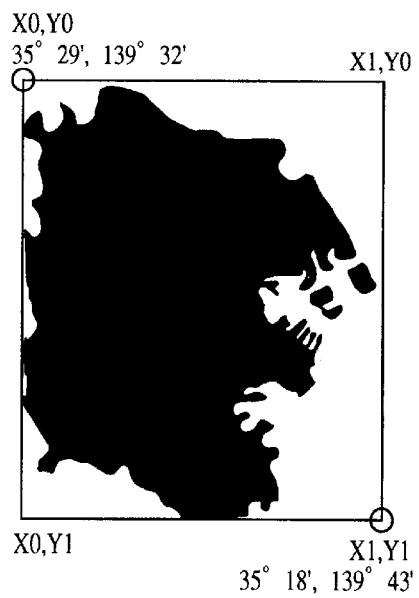
(d) YOKOHAMA CITY

DETAILED CLASSIFICATION

TOKYO METROPOLIS      (X0, Y0), (X1, Y1), (X2, Y2), (X3, Y3), . . . . . . . .
KANAGAWA PREFECTURE   (X0, Y0), (X1, Y1), (X2, Y2), (X3, Y3), . . . . . . . . . . . . .
..................................................................................................................................................
..................................................................................................................................................
..................................................................................................................................................

FIG. 10

HOME-PAGE CORRESPONDING TABLE

Table 1
    JAPAN      [ http : // japan. co. jp ]
                        [ http : // japan_tourist. co. jp ]
                        [ http : // . . . . . . . . . . . . ]
                        [ http : // . . . . . . . . . . . . ]

Table 2
    Tokyo      [ http : // tokyo. co. jp ]
                        [ http : // tokyo_tourist. co. jp ]
                        [ http : // tokyo_station. co. jp ]
                        [ http : // . . . . . . . . . . . . ]
                        [ http : // . . . . . . . . . . . . ]
    Kanagawa      [ http : // kanagawa. co. jp ]
                        [ http : // kanagawa_train. co. jp ]
                        [ http : // . . . . . . . . . . . . ]

Table 3
    Yokohama      [ http : // yokohama. co. jp ]
                        [ http : // yokohama_tourist. co. jp ]
                        [ http : // yokohama_univ. co. jp ]
                        [ http : // . . . . . . . . . . . . ]

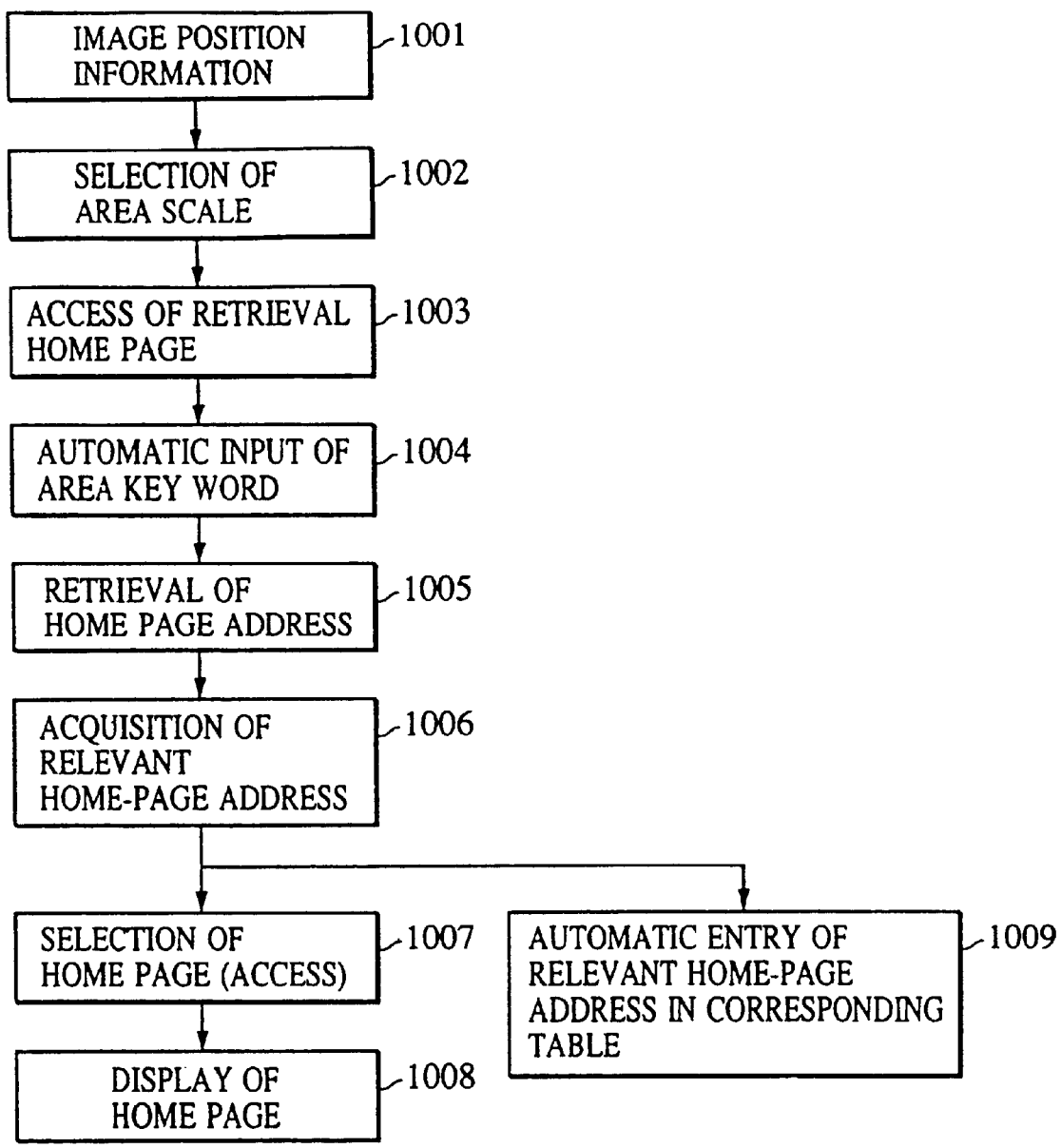

RETRIEVAL HOME PAGE

GPS DIGITAL CAMERA WITH
PHOTOGRAPHING OBJECT INPUT

GPS DIGITAL CAMERA WITH
PHOTOGRAPHING OBJECT INPUT

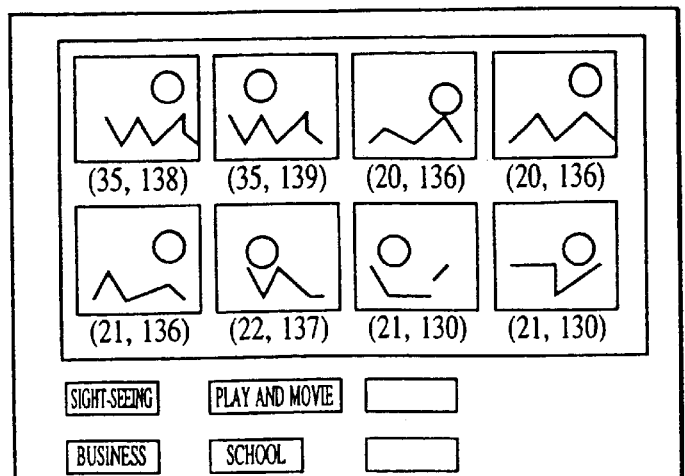
PHOTOGRAPHING-OBJECT INPUT SCREEN
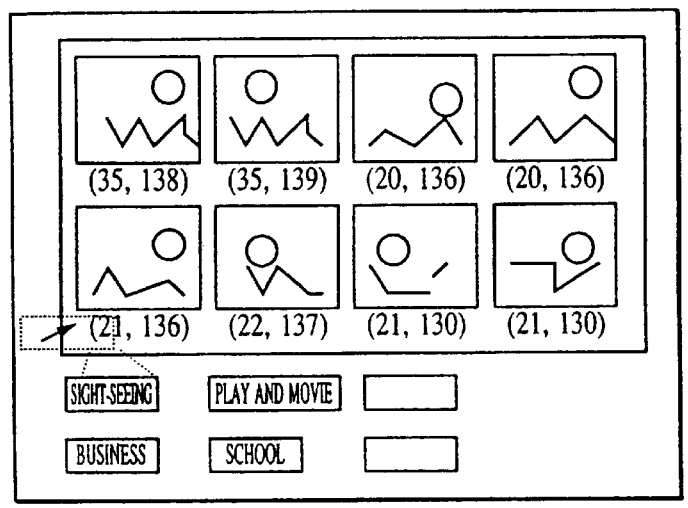
PHOTOGRAPHING-OBJECT DRAG-&-DROP INPUT SCREEN (TO THE WHOLE)
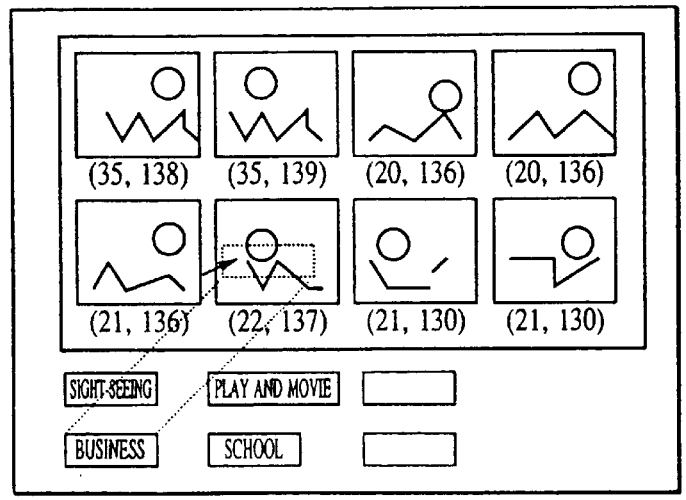
PHOTOGRAPHING-OBJECT DRAG-&-DROP INPUT SCREEN (TO A PART)

IMAGE INPUT ACCESS FLOW

COMMUNICATION APPARATUS AND METHOD THAT LINK A NETWORK ADDRESS WITH DESIGNATED IMAGE INFORMATION

BACKGROUND OF THE INVENTION

1. Field of the Invention

The present invention relates to an image recording method and communication method and an image recording apparatus and communication apparatus.

2. Description of the Related Art

A technique for recording an image signal together with information for the time when the image signal is recorded is conventionally known.

However, the conventional method has problems, in that it is impossible to record information indicating the place where an image signal is recorded, and it is impossible to read the location where the image signal is recorded (such as latitude, longitude, altitude, et.).

Moreover, there is no method fully suitable for dealing with a case in which GPS information cannot be obtained when capturing location information using the method referred to as the GPS method of computing a position by a satellite; therefore, in such a case, recorded image information may not be effectively used.

SUMMARY OF THE INVENTION

It is an object of the present invention to solve the above-described problems. It is another object of the present invention to provide a method and an apparatus making it possible to obtain location information effectively. It is still another object of the present invention to provide a method and an apparatus making it possible to obtain effective substitute information when location information cannot be obtained.

For the above objects, preferred embodiments of the present invention disclose an image recording method for recording location information together with image information, in which the step of deciding whether the location information can be obtained, and a method for recording substitute information together with the image when it is not decided that the location information can be obtained, are disclosed.

In the above method, the substitute information is the location information input immediately before or after, or manually input information. Moreover, when the location information cannot be obtained, that fact is communicated to the user so as to decrease the burden on the user and record an image together with image location information.

Moreover, it is still another object of the present invention to provide a digital camera having a novel function.

Furthermore, it is still another object of the present invention to provide an apparatus and a method making it possible to quickly access a network in accordance with a recorded image.

Furthermore, it is still another object of the present invention to provide an apparatus and a method making it possible to quickly access a network in accordance with the purpose of a recorded image.

Other objects and features of the present invention will become more apparent from the accompanying embodiments and description of drawings.

BRIEF DESCRIPTION OF THE DRAWINGS

FIG. 1 is a flow chart of a method of this embodiment for recording image obtained location information;

FIGS. 6A and 6B are flow charts of the image location information display method of an embodiment of the present invention;

FIG. 8 is an illustration showing area classification;

FIGS. 9A and 9B are illustrations for explaining latitude and longitude information areas;

FIG. 10 is a home-page corresponding table;

FIG. 11 is a retrieval home-page access flow;

FIGS. 13A-1 to 13B-3 are illustrations for explaining the appearances and structures of apparatuses having photographing purpose input means;

DESCRIPTION OF THE PREFERRED EMBODIMENTS

[Embodiment 1]

The preferred embodiments of the present invention are described below.

Figure 2:
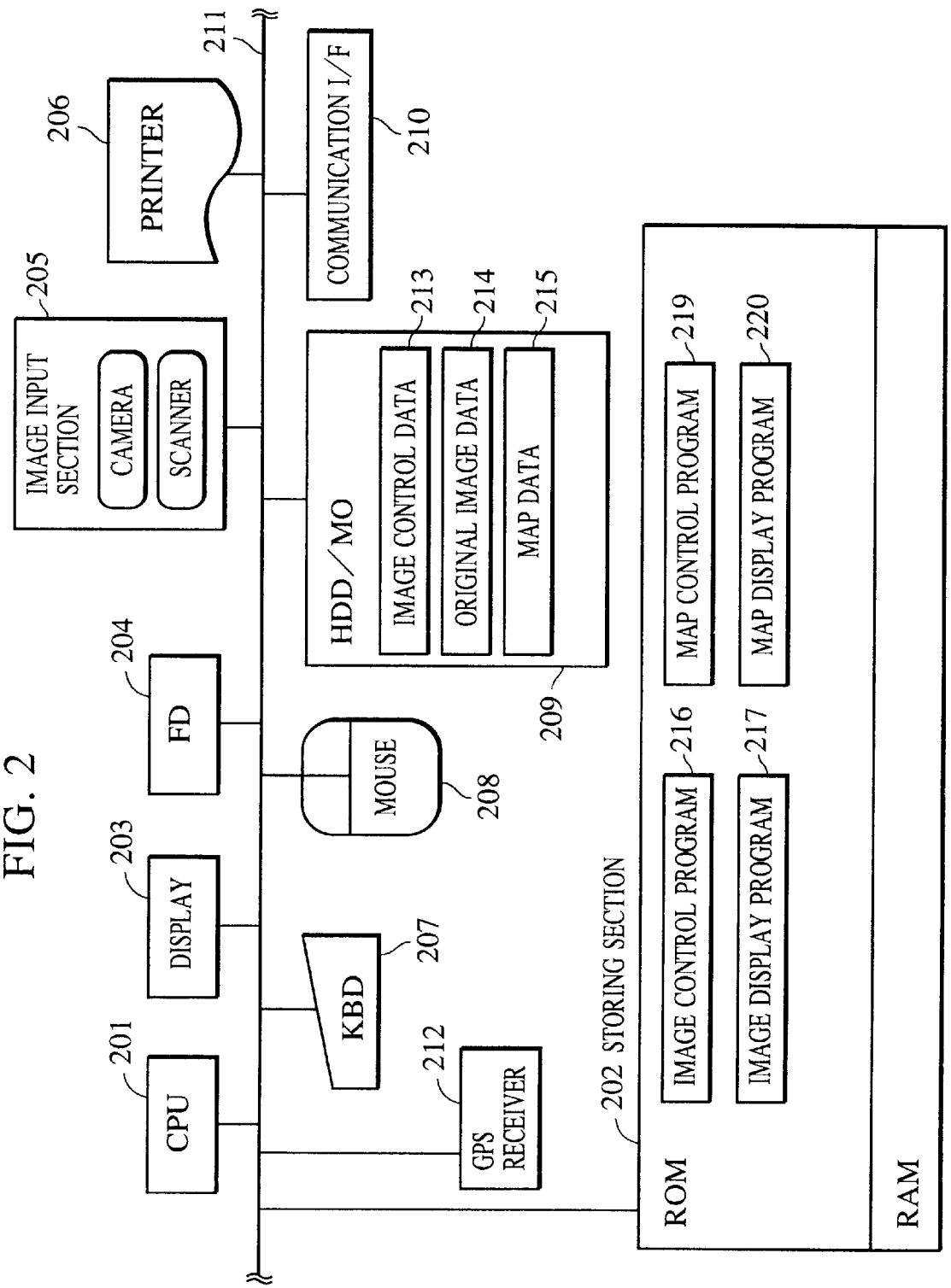
FIG. 2 is a system block diagram of the image controller of this embodiment.

FIG. 2 is a system block diagram of an image controller with which the image photographing location recording method of this embodiment can be performed.

In FIG. 2, symbol 201 denotes a central processing unit (CPU) for operation and control, and 202 denotes a storing section including a ROM and RAM; for example, the ROM stores an image control program 216, an image display program 217, a map control program 219, and a map display program 220.

Symbol 203 denotes a display (DISPLAY) for displaying image information, map information, a designation icon, or a cursor, 204 denotes a floppy disk (FD) for storing a program or image data, 205 denotes an image input section for reading an image from a camera or scanner, 206 denotes a printer for printing an image selected by a user, 207 denotes a keyboard (KBD) having keys to be designated by an operator, 208 denotes a mouse for designating an operation by clicking the designation icon or moving the cursor, 209 denotes a memory system such as a hard disk drive (HDD) or magnetooptical disk (MO) for storing image control data 213 for controlling an image such as an image keyword, original image data 214, or map data 215, 210 denotes a communication interface for transmitting or receiving image information, 212 denotes a GPS receiver for obtaining GPS (Global Positioning System) information serving as location information, and 211 denotes a bus connecting the above units.

To apply the present invention to a GPS receiver camera of an embodiment of the present invention, for example, it is necessary to remove the printer 206, keyboard 212, and mouse 208 from FIG. 2.

Figures 1, 13A:
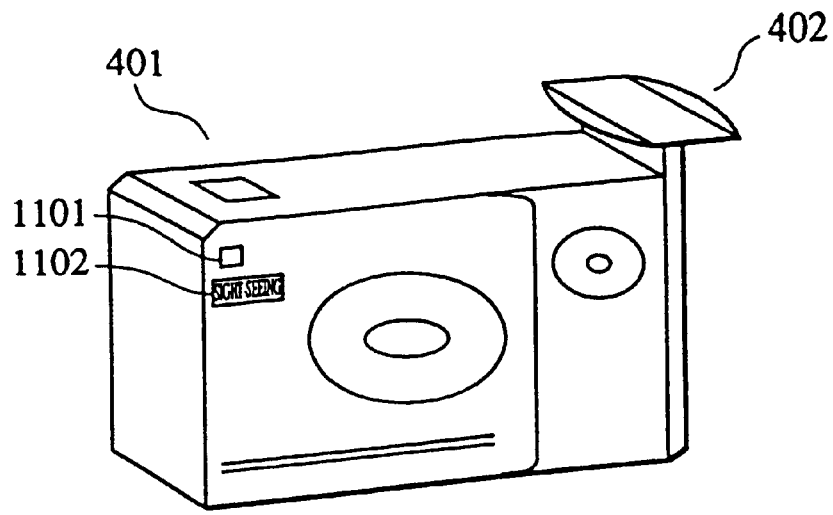

FIG. 1 is a flow chart showing an embodiment of an image photographing location recording method using GPS information.

When a user starts photographing, an image signal input by the image input section 205 is recorded in the memory system (hard disk) 209 (step 101) and it is first decided whether to use GPS information (step 102). The system is instructed in advance by the user through the keyboard 207 whether to use GPS information. When using GPS information, it is decided whether the present GPS information can be obtained (step 103). When the present GPS information can be obtained, the present time and the present location information obtained by a GPS receiver are temporarily stored in the memory system 209 for the next photographing (step 110), the location information already recorded in step 101 to serve as the position information of image information is recorded in the memory system 209 (step 111) and the flow terminates (step 112). An image and location information can be recorded in an analog recording medium such as a silver film or a digital recording medium such as a hard disk, MO, or flash memory.

When it is difficult to obtain GPS information because the equipment is indoors or due to the influence of a building, the flow branches from step 103 to step 104. Therefore, it is decided whether to use the previous GPS information, in accordance with (1) the time of the last GPS information in which the location information is not indeterminate, (2) a certain time previously set by the system or set by the user, and (3) the present time (step 104). When a certain time has passed after the previous GPS information obtaining time, the flow branches from step 104 to step 105 to set the location information indeterminate (step 105). When a certain time does not pass after the previous GPS information obtaining time, the flow branches from step 105 to step 106 to set the previous location information (step 106). Then, the present time and the present location information are stored for the next photographing (step 110), image information and location information are recorded (step 111), and the flow terminates (step 112).

When GPS is not used in step 102, it is further decided whether to manually set location information (step 107). When location information is not manually set, the location information is set indeterminate (step 108). When the location information is manually set, a user sets a location by using map data (step 109).

Manual setting of the location information in step 109 is effective when adding the indeterminate location information to the image information already photographed in step 101 and recorded in a recording apparatus 109 or setting location information again.

The flow chart in FIG. 1 has been described by using a case of photographing an image. However, the setting of location information is not restricted to a case of photographing an image. It is also possible to set location information when capturing an image using a scanner, creating an image by image application software, or controlling an image by image control application.

Then, an embodiment of the present invention is described below.

Figure 3:
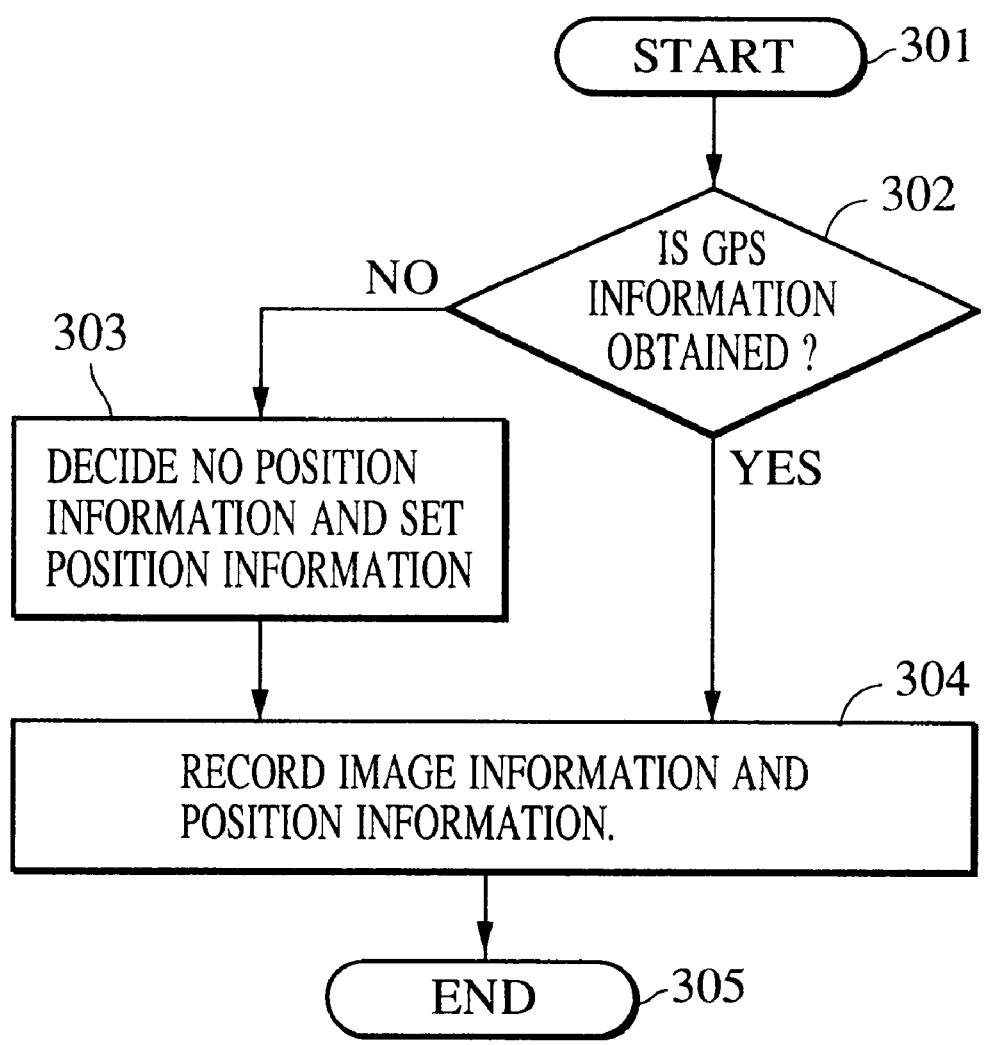
FIG. 3 is a flow chart of another method of this embodiment for recording image photographed location information.

FIG. 3 is a flow chart for recording location information by setting a GPS receiver to a camera.

When a user starts photographing (step 301), it is first decided whether the present GPS information can be obtained by the GPS receiver (step 302). When the GPS information can be obtained, image information and the location information obtained by the GPS receiver are recorded simultaneously. Image and location information can be recorded in an analog recording medium such as a silver film or a digital recording medium such as a flash memory. When it is difficult to obtain GPS information because of being indoors, location information is set as "indeterminate" (step 303), image and location information are recorded (step 304), and the flow terminates (step 305).

According to this embodiment, it is possible to use the decision on whether location information cannot be recorded due to any trouble of an apparatus or position information is indeterminate as an example because position information is set "indeterminate" when location information cannot be obtained.

Moreover, location information related to an image is location attribute information such as photographing location information, creating location information, or control place information and moreover, location information intentionally related by a user can be used.

Furthermore, it is possible to obtain location information from radio waves output from a station at a predetermined position, satellite, or ground station.

Furthermore, it is possible to obtain not only latitude and longitude information but also altitude information from a GPS.

As described above, the image recording method of this embodiment makes it possible automatically to add location information for image data by minimizing the load of a user. Moreover, it is possible manually to record location information together with an obtained image by adding image location information.

[Embodiment 2]

Then, another embodiment of the present invention is described below. This embodiment discloses a method of access a network in accordance with position information recorded together with image information.

Figures 2, 13A:
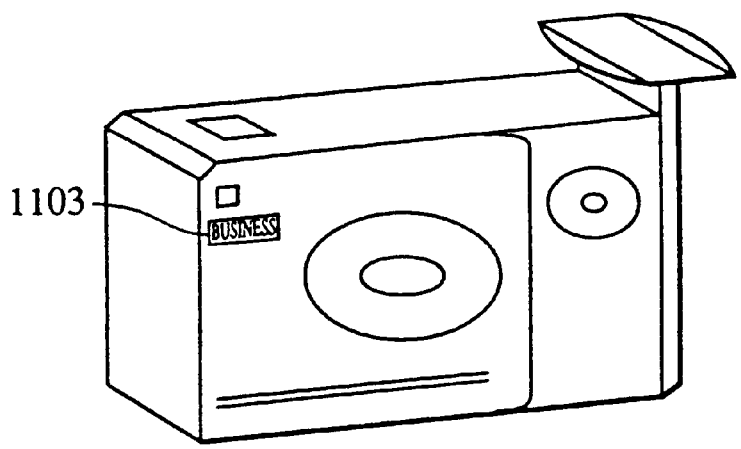

FIG. 13 also shows that position information obtained from a GPS is added to an image. This embodiment basically shows the pieces of information for latitude and longitude, but these values are uninteresting and ununderstandable. Therefore, as shown in FIG. 13, it is possible to display a city, prefecture, area, or country depending on selection. FIGS. 13A-1 to 13B-3 show images photographed at a place in Yokohama. In the case of latitude and longitude, a position is recorded within an error range of several meters. Because the use of this embodiment does not require detailed information within an error range of several meters, it is possible to gradually expand a range like "YOKOHAMA," "KANAGAWA," "KANTO," and "JAPAN" in accordance with a conversion table. Normally, a mode "YOKOHAMA" or "KANAGAWA" is set. In the case of an overseas country, one can expand the range up to "country."

Figure 15:
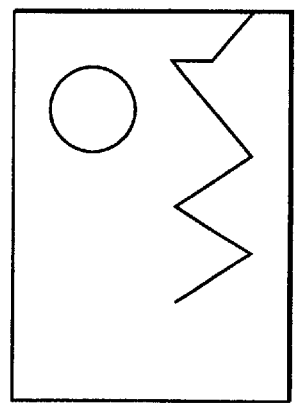
FIG. 15 is an illustration for explaining conversion of position information into area information.

The examples in FIG. 15 show up to degrees and minutes of latitude and longitude. In fact, however, it is possible to obtain a value precise to the second.

A digital camera with a GPS is used as the image recording apparatus of this embodiment in order to obtain the above image information. This digital camera is as has been described with reference to FIGS. 1 to 3. This camera can be freely carried to any place, and its position when recording an image is recorded together with image information in detail. It is one of the features of this embodiment to access a site (home page) on the Internet in accordance with the position information attached to the image information input by the digital camera.

Figure 5A:
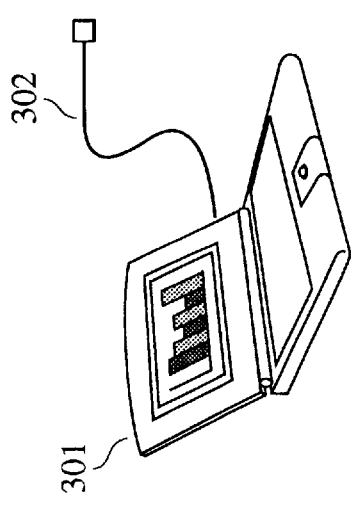
FIGS. 5A and 5B are a full view of an image processor used for the digital camera of this embodiment and a block diagram showing the structure of the image processor.

FIG. 5 shows a computer communication apparatus to this embodiment. FIG. 5 is a system block diagram of a system with which one case performs the automatic image Internet linking method of this embodiment. FIG. 5A shows a notebook-type personal computer.

Figure 4B:
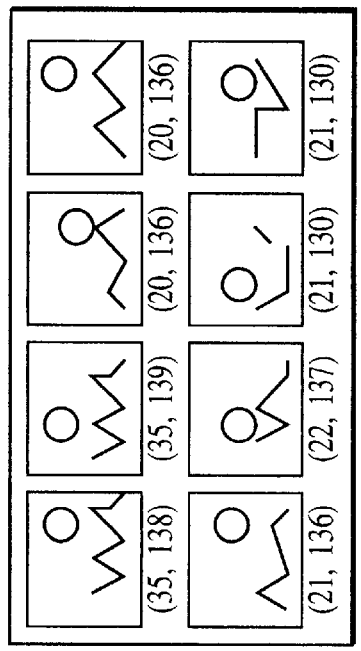
FIGS. 4A and 4B are illustrations showing the full view of a digital camera of this embodiment and display screens when reproducing an image recorded by the digital camera.
Figure 4A:
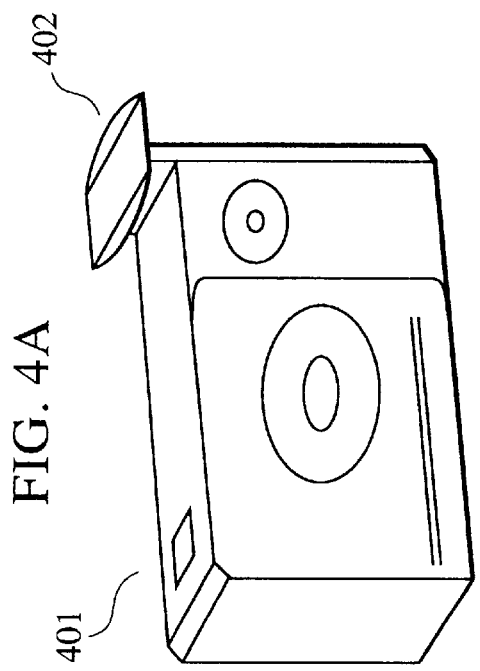

In FIG. 5A, symbol 301 denotes a personal computer body and 302 denotes a cable for connecting the computer to a communication line. Though the notebook-type personal computer is shown, it is also possible to use a typical desktop personal computer to or work station. A user inputs image data into a personal computer by using input means such as a memory card and makes the personal computer access a network such as the Internet by using communication means such as RS232C. Moreover, the user displays an image by using a display method such as a method to be derived. Display examples are shown in FIG. 4B.

Figure 5B:
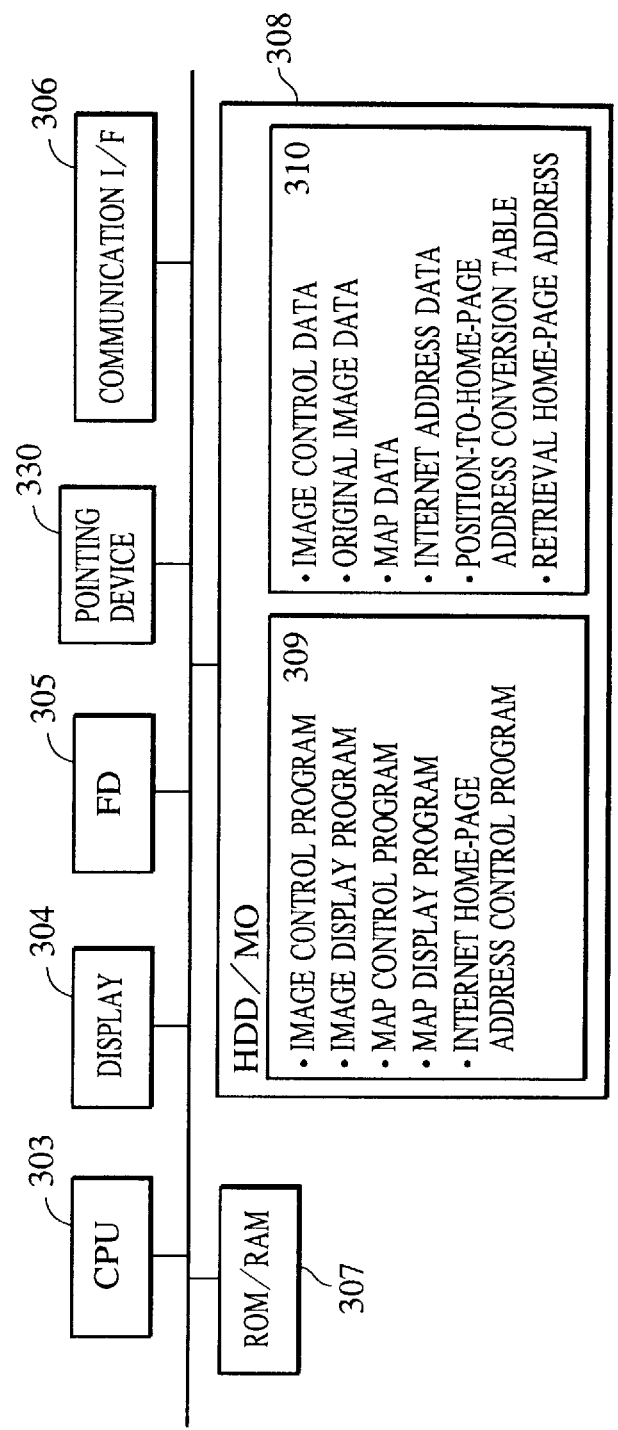

FIG. 5B shows a system block diagram of the computer communication apparatus of this embodiment. In FIG. 5B, symbol 303 denotes a central processing unit (CPU) for operation and control, 304 denotes a display (DISPLAY) for displaying image information, map information, designation icon, or cursor, 305 denotes a floppy disk (FD) for storing a program or image data, 306 denotes a communication I/F for connection with an external communication line, and 307 denotes a storing section including a ROM and a RAM. The ROM stores a program for controlling a personal computer. The control program uses a part of the RAM but an application program uses most part of the RAM. Image data is also temporarily stored in the area used by the application program. Symbol 308 denotes a storing medium section which comprises a hard disk or magnetooptical disk. Main programs and main data of the apparatus of this embodiment are stored in the storing medium section. Symbol 309 denotes main programs. Symbol 310 denotes a main data section. Symbol 310 denotes a pointing device for designating an image or the like.

The program section 309 stores an image control program, image display program, map control program, map display program, and Internet home-page address control program.

The data section 310 stores image control data, original image data, map data, Internet address data, position-home-page conversion table, and retrieval homepage address data.

Now, operations of this embodiment are described below by using image display as an example and using a flow chart.

Figure 6A:
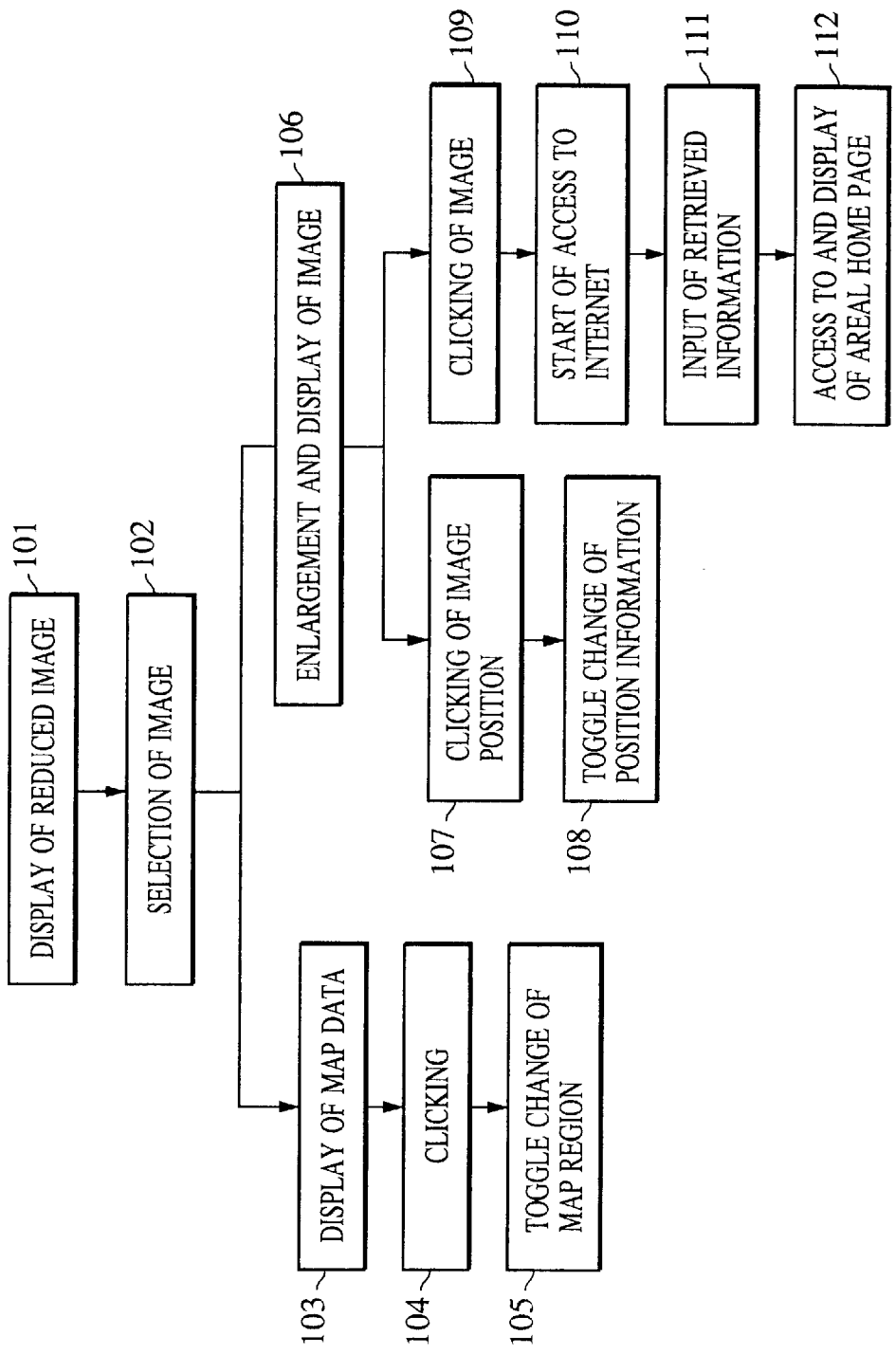

FIGS. 6A and 6B are the above flow chart, and FIGS. 7A to 7D are display examples.

Figure 7A:
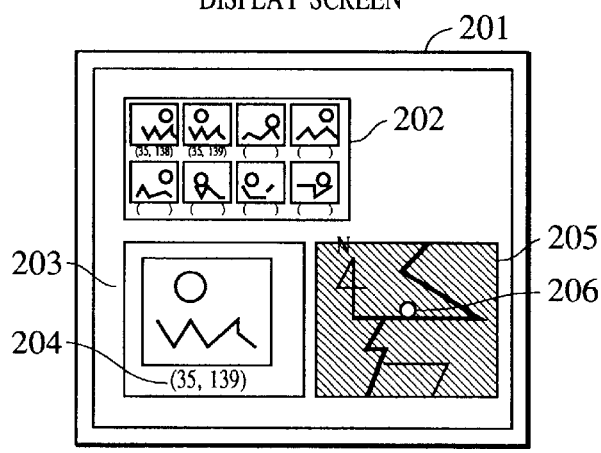
FIGS. 7A to 7D are display screens of the above embodiment and internet home-page linkage screens.

First, reduced images are displayed on the display 304 of the personal computer body 301 in FIG. 5A in the tile format shown by symbol 202 in FIG. 7A (step 101 in FIG. 6A). An operator (user) selects a purposed image out of the images (step 102). When an image is selected, an image 203 is enlarged and displayed by the pointing device 330 (step 205).

Figure 7B:
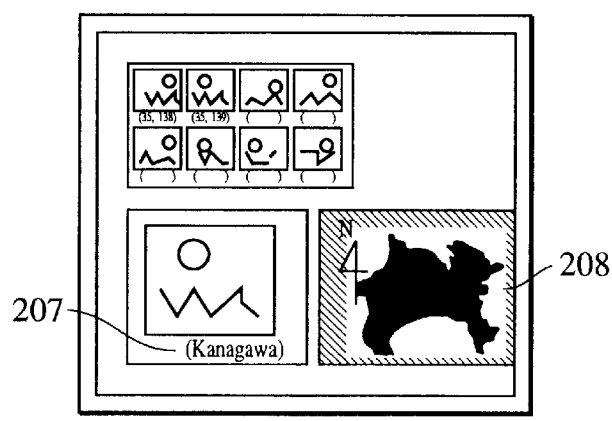

Position information 204 is changed to the above city name or the like by clicking the numerical portion of the information 204 (steps 107 and 108). FIG. 7B shows position information changed to "KANAGAWA."

The map shown by symbol 205 in FIG. 7A is linked with image position information to show a place where the area around the map is automatically displayed (step 103). Symbol 206 denotes a mark showing a place where the image is photographed. The mark can be accurately shown by the latitude and longitude information showing the values of the place by symbol 204.

The map 205 can be changed to a wide-area map by clicking it (steps 104 and 105). Symbol 208 in FIG. 7B shows that the map is changed to the whole KANAGAWA Prefecture.

Figure 7C:
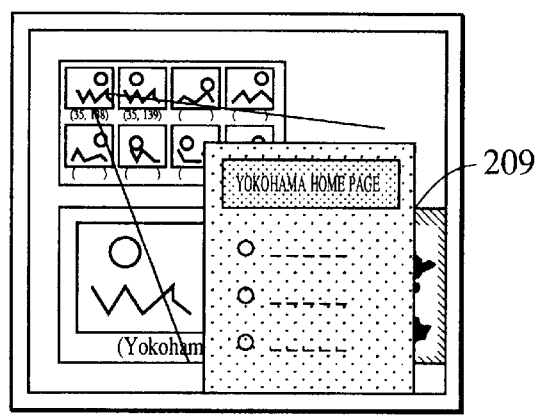

By continuously clicking the image 203 (step 109), the name of an area 207 serves as a keyword and it is started to access a home page corresponding to the keyword on the internet (step 110). FIG. 7C shows an illustration in which a home page of YOKOHAMA is accessed. Symbol 209 denotes the home page of YOKOHAMA. In general, a home page of a public institution directly uses its place name in many cases, and a home page of a municipal office is accessed in most cases (step 112).

There are several methods for accessing a home page other than the home page of a municipal office.

Figure 7D:
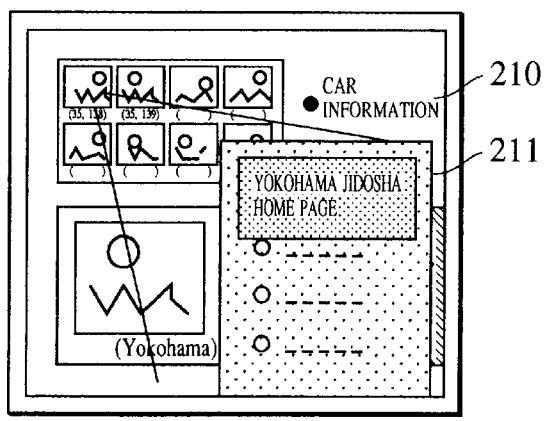

This embodiment shows a case of inputting a retrieval condition. Symbol 210 in FIG. 7D shows an item for inputting or selecting retrieval information. This example further includes automobile-related matter as a retrieval condition. The operation for inputting this retrieval condition is shown in step 111. It is possible to set a retrieval condition in advance. In the case of the example shown in FIG. 7D, automobile related matter is input as a retrieval condition, and an example of accessing the home page of automobile-related matter in YOKOHAMA shown in step 211 is shown.

After the above flow, a case is shown in which an Internet home page of the area is automatically accessed in accordance with an image. Contents of each home page include various novel ideas. Therefore, by allowing the procedure, in other words, by accessing another "URL" in accordance with linked information set to each home page, it is possible to obtain every type of information.

Then, the detail for accessing a home page in accordance with position information of an image is described below which is one of the points of this embodiment.

FIG. 6B shows a procedure for linking position information to a home page.

In step 120, image position information is the above described latitude and longitude information. In step 121, an area scale is selected. FIG. 8 shows grouped information referred to as area classification. A group for selecting countries in the world is provided for GROUP A (countries) and in the case of Japan, a group for selecting local areas is provided for GROUP B (local areas), a group for selecting TO, DO, FU, and Prefectures is provided for GROUP C (TO, DO, FU, and Prefectures), a group for selecting cities, towns, and villages is provided for GROUP D (cities), and a group for selecting districts is provided for GROUP E (districts). According to the above selection, a keyword for an area scale is set.

Figure 9B:
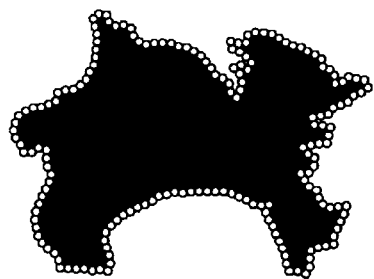

FIGS. 9A and 9B show classification tables of the names of areas corresponding to the latitude and longitude information in step 121 in FIG. 6B. The rough classification (rectangular region of area) in FIG. 9A shows a classification in which the latitude and longitude information of maximum external rectangular regions of (a) Kanto District, (b) Tokyo Metropolis, (c) Kanagawa Prefecture, and (d) Yokohama City is stored. It is possible to approximately specify an area in accordance with the latitude and longitude information given by the rough classification.

In the case of the detailed classification in FIG. 9B, a detailed table including contour latitude and longitude information of each area is stored. It is enough for the detail to have an accuracy of a certain extent. As the accuracy is further improved, information content increases and the scale of the classification table increases. Moreover, retrieval requires more time.

An application of this embodiment does not require very detailed information.

In step 122 in FIG. 6B, the address of an internet home page is obtained from the keyword of an area name. FIG. 10 shows home-page corresponding tables between the homepage address and the keyword of the area name. Table 1 shows the home page addresses corresponding to the keyword "JAPAN." In this case, higher priority is given to a more-general home-page address. A home page of a country corresponds to it. Table 2 shows a corresponding table of home-page addresses corresponding to such keywords as "TOKYO" and "KANAGAWA. Similarly, Table 3 shows home-page addresses corresponding to the keyword "YOKOHAMA."

Details of the home-page address corresponding tables are described above.

In step 123 in FIG. 6B, a case of adding a keyword such as the above described "automobile" is shown as a retrieval code input. However, it is also possible to retrieve a more-preferable retrieval code input from the home-page address table shown in FIG. 10 by further adding such keywords as "sight-seeing" and "enterprise" and giving higher priority to the input. Of course, there is a method of inputting no data. In this case, the home page of the above-described municipal office is connected.

In step 124, linking from the retrieved home page, that is, from the URL on the Internet to a home page accessing of the internet is started.

In step 125, an image is linked with a desired home page.

As described above, means for automatically linking an image with the internal and a computer communication apparatus are realized.

[Embodiment 3]

Now, another embodiment of the present invention is described below.

The image input system is the same as that of the embodiment 1. A different method for linking from position information added to an image to a home page is described below.

FIG. 11 shows the flow chart.

Step 1001 (image position information) and step 1002 (area scale selection) use the same method as that in steps 120 and 121 of the previous embodiment.

Step 1003 showing home-page access uses a method for accessing a home page for retrieving a home page on the internet. Because the number of Internet home pages is continually increasing a user cannot completely use such home pages unless there is a tool for retrieving such a home page. Therefore, many home pages dedicated to retrieval are opened. This embodiment uses these retrieval home pages.

Figure 12:
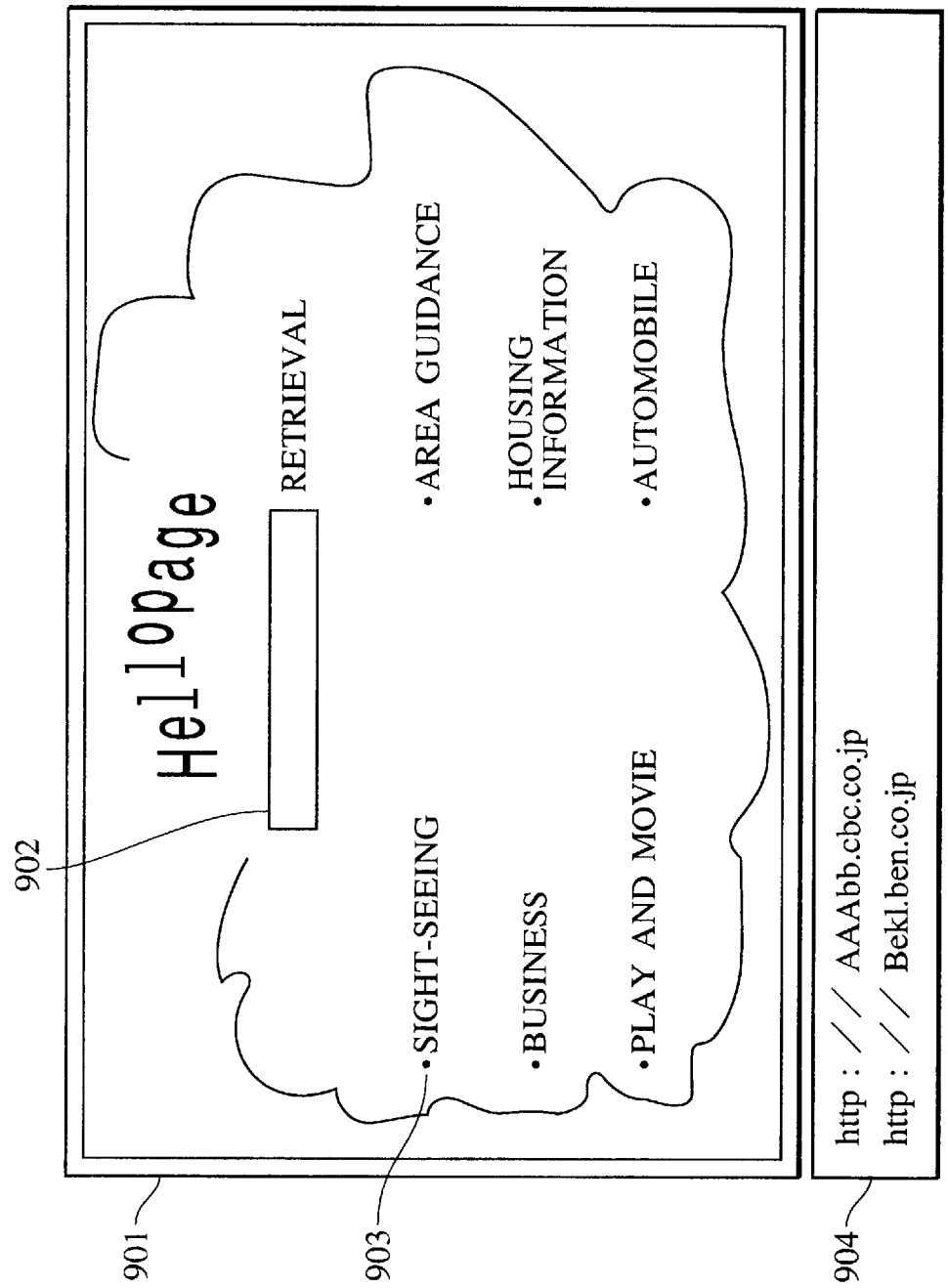
FIG. 12 is a retrieval home page.

Therefore, as shown in this embodiment, when an image is automatically linked with a retrieval home page is realized, the retrieval home page shown in FIG. 12 is displayed. This is merely one example. In FIG. 12, symbol 901 denotes the whole window and 902 denotes a dialog box for inputting a retrieval keyword. Symbol 903 denotes each category which serves as a home-page retrieval keyword together with the retrieval keyword 902.

In the case of this embodiment, the name of the place of the position information added to image data is input to the dialog box 902. For example, a keyword such as "Yokohama" is input. A use can freely select the category 903. All messages are retrieved through the summary of each home page by these keywords and a desired home page address can be obtained.

A list of retrieved home-page addresses is displayed on symbol 904.

Retrieval in accordance with position information in the case of the embodiment 1 starts with the name of a home page address. In the case of the embodiment 2, however, more home pages are retrieved because up to the content of a home page is a single retrieval object.

A user selects a desired home page from among the home pages.

In step 1006 in FIG. 11, the above home page address is obtained. In step 1007, by clicking the selected home page address, the address is linked to the page.

In step 1008, a home page is displayed.

In step 1009, a retrieved home-page address is entered in an address corresponding table. From the next time, the address can be linked without retrieving it.

In the case of the embodiment 3, a method for linking an image using a retrieval home page with a home page is described.

[Embodiment 4]

Still another embodiment of the present invention is described below.

In the case of the retrieval home page of the embodiment 2, it is possible to input a photographing purpose as a keyword in addition to the keyword indicating the place. This is because an intended home page can be narrowed down to retrieve a home page to be selected using a keyword such as "sight-seeing."

Now, using this embodiment for the case of inputting a photographing purpose when recording an image in a medium, that is, when recording an image by a digital camera and a case of inputting the photographing purpose when displaying the image, is described below.

FIG. 13A-1 shows the appearance of a GPS digital camera with a photographing purpose input. In FIG. 13A-1, symbol 1102 denotes a display window for making a user confirm an item content selected by the user as a photographing purpose. Symbol 1101 denotes an operating portion such as a push button for changing a photographing-purpose category.

Figure 14A:
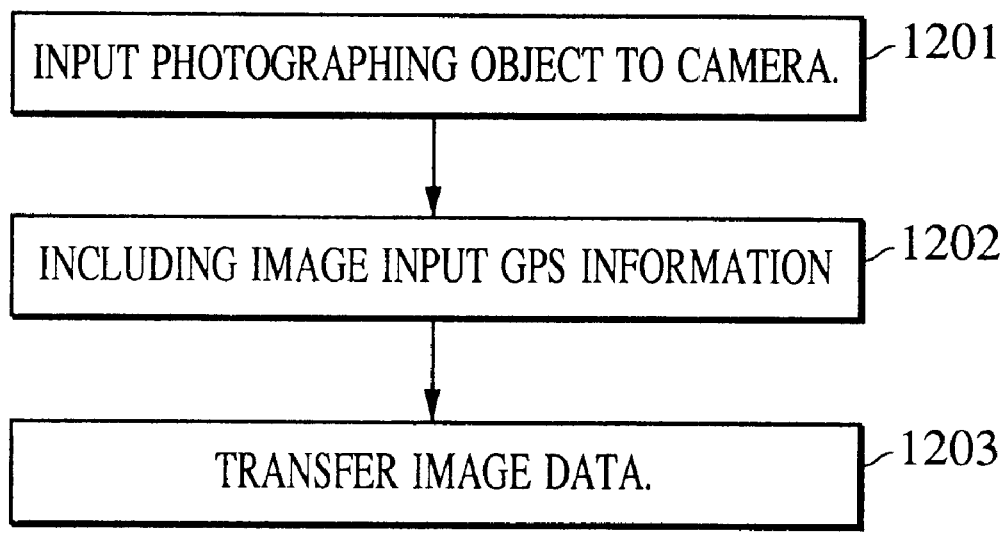
FIGS. 14A and 14B are image input access flows.

FIG. 13A-2 shows a state in which the category is changed as the business shown by symbol 1103. FIG. 14A shows a flow chart of the state.

In step 1201, a photographing purpose is input to the camera. This is followed by an operation for changing the category before the purpose is changed.

In step 1202, an image is input. In the case of this embodiment, a subject is photographed and converted into an image signal to enter the image of the subject. In this case, latitude and longitude information one stored together.

In step 1203, the image signal obtained through the conversion is transferred to the computer side. In this case, it is possible to use the above communication cable or a memory card.

The photographing purpose is added to the image. Then, a method for inputting the photographing purpose when displaying a reduced image is described below.

FIG. 13B-1 shows display examples of reduced images. For these display examples, a dialog box of a photographing purpose is prepared in addition to the display examples in FIG. 4B.

When selecting the dialog box and photographing the whole image as a purpose, drag-and-drop operation is applied to the whole frame as shown in FIG. 13B-2. Thereby, for example, a keyword "sight-seeing" is added to the whole image.

When individually adding, for example, a keyword "business" to an image already recorded after photographing, a box "business" is added to an individual image by drag-and-drop the box as shown in FIG. 13B-3.

Figure 14B:
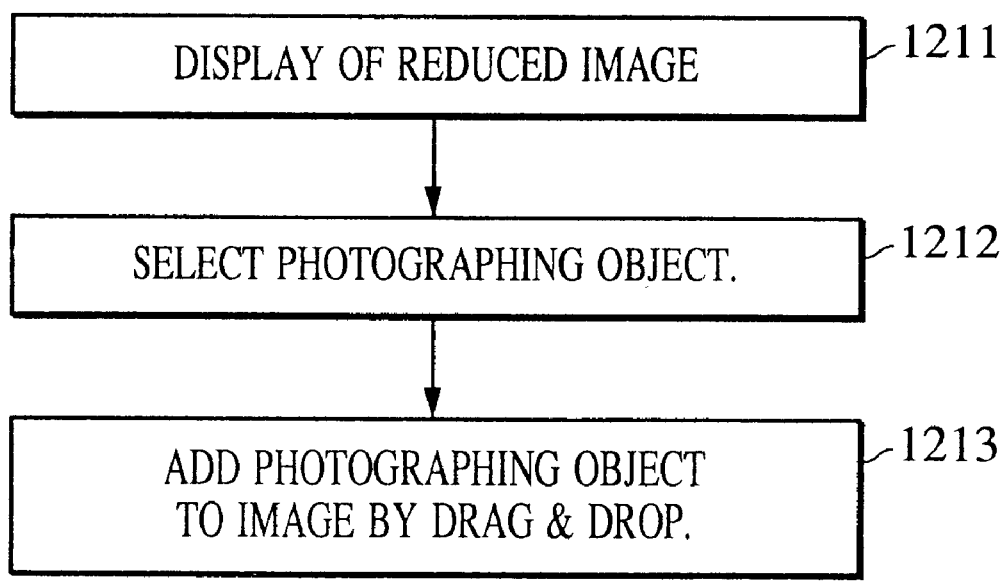

FIG. 14B shows the above flow.

In step 1211, a reduced image is displayed. In step 1212, a photographing purpose is selected. In this case, it is permitted to select a prepared dialog box.

In step 1213, the photographing purpose is added to an image through drag-and-drop operation.

In accordance with the above operation, the photographing purpose is added to the image, a new photographing purpose is entered or a previously entered photographing purpose is changed and the new one added to the image in addition to the photographing purpose already added to the image.

As described above, by adding position information and a photographing purpose to an image and moreover automatically inputting the information for the photographing purpose to the dialog box of the retrieval keyword of the retrieval home page in FIG. 12, the image is automatically linked with a proper home page on the internet.

In the above description, the location information related to an image is location attribute information such as photographing location information, creating location information, or control place information. Therefore, location information intentionally related by a user can also be used.

As described above, by using a method and apparatus for automatic linking an image with an internet home page, the added value of an image photographed by a digital camera or the like is raised and it is possible not only to enjoy an image and confirm a video but also obtain wider information.

Moreover, even only confirming a photographed image is a considerably effective usage.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MP) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments be realized by executing the program codes which are read by a computer, the present invention includes a case where an OS (operating system) or the like working on the computer preforms a part or all of a set of processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or all of a process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
generation means for generating image information and location information corresponding to the image information by retrieving information based on a user's input word, said image information representing plural images;
address generating means for generating a network address according to the location information generated by said image information generation means based on image information designated by a user from among the plural images represented by the image information; and
means for linking with a network address generated by said address generating means,
wherein said generation means is means for generating location information by a GPS.

2. A communication apparatus according to claim 1, wherein said generation means is previously provided with a corresponding table of location information and network addresses.

3. A communication apparatus according to claim 1, further comprising image pickup means for picking up a subject.

4. A communication apparatus according to claim 3, wherein said location information generation means is means for generating the location information of the place where image pickup is performed by said image pickup means.

5. A communication apparatus according to claim 3, further comprising storage means for storing a signal corresponding to a subject picked up by said image pickup means in a medium.

6. A communication apparatus according to claim 5, wherein said medium is a semiconductor memory.

7. A communication apparatus according to claim 1, wherein said address generating means is means for generating the name of area information according to the location generated by said location information generation means.

8. A communication apparatus according to claim 1, further comprising means for generating the address of an Internet home page including an area name in accordance with said location information.

9. A communication apparatus according to claim 8, wherein said generation means is previously provided with a corresponding table of location and Internet address.

10. A communication apparatus according to claim 1, wherein the location information is data for latitude and longitude.

11. A communication apparatus according to claim 9, wherein the corresponding table can be retrieved.

12. A communication apparatus according to claim 1, wherein said network is an Internet network and said linkage means has means for linking with an Internet address retrieval home page, automatically inputting location information as a retrieval keyword, and retrieving an Internet address.

13. A communication apparatus according to claim 12, further comprising a corresponding table of location information and an Internet address, and wherein an address retrieved by said linking means can be automatically entered in said corresponding table.

14. A communication method, comprising the steps of:
generating image information and location information corresponding to the image information by retrieving information based on a user's input word, said image information representing plural images;

generating a network address according to the location information generated in said information-generating step based on image information designated by a user from among the plural images represented by the image information; and linking with a network address generated in said address-generating step, wherein, said information-generating step includes generating location information by means of a GPS.

15. A communication method according to claim 14, wherein said address-generating step is performed using a corresponding table of location information and network addresses.

16. A communication method according to claim 14, further comprising the step of picking up an image of a subject.

17. A communication method according to claim 16, wherein the location information generated is location information of the place where image pickup is performed.

18. A communication method according to claim 16, further comprising the step of storing, in a storage medium, a signal corresponding to a subject picked up in said image picking-up step.

19. A communication method according to claim 18, wherein the medium is a semiconductor memory.

20. A communication method according to claim 14, wherein said address-generating step includes generating the name of area information according to the location generated in said information-generating step.

21. A communication method according to claim 14, further comprising the step of generating the address of an Internet home page including an area name in accordance with said area information.

22. A communication method according to claim 21, wherein said address-generated step is performed using a corresponding table of location and Internet address.

23. A communication method according to claim 14, wherein the location information is data for latitude and longitude.

24. A communication method according to claim 22, wherein the corresponding table can be retrieved.

25. A communication method according to claim 14, wherein the network is an Internet network and said linking step includes linking with an Internet address retrieval home page, automatically inputting location information as a retrieval keyword, and retrieving an Internet address.

26. A communication apparatus comprising:

information generation means for generating image information and location information corresponding to the image information by retrieving information based on a user's input word, said image information representing plural images;

address generating means for generating a network address according to the location information generated by said information generation means from among the plural images represented by the image information;

means for linking with a network address generated by said address generating means; and means for generating the address of an Internet home page including an area name in accordance with area information corresponding to the location information, wherein said information generation means is means for generating location information by a GPS.

27. A communication apparatus comprising:

information generation means for generating image information and location information corresponding to the image information by retrieving information based on a user's input word, said image information representing plural images;

address generating means for generating a network address according to the location information generated by said information generation means from among the plural images represented by the image information; and means for linking with a network address generated by said address generating means, wherein the network is an Internet network, and said linking includes linking with an Internet address retrieval home page, automatically inputting location information as a retrieval keyword and retrieving an Internet address, wherein said information generation means is means for generating location information by a GPS.

* * * * *

UNITED STATES PATENT AND TRADEMARK OFFICE
CERTIFICATE OF CORRECTION

PATENT NO.     : 6,507,371 B1
DATED          : January 14, 2003
INVENTOR(S)    : Hashimoto et al.

It is certified that error appears in the above-identified patent and that said Letters Patent is hereby corrected as shown below:

Column 1,
Line 20, "et.)." should read -- etc.). --.

Column 3,
Line 18, "111)" should read -- 111), --.

Column 4,
Line 67, "case performs" should read -- can perform --.

Column 5,
Line 6, "to" should be deleted.

Column 6,
Line 33, "above" should read -- above- --.

Column 7,
Line 13, "above described" should read -- above-described --; and
Line 66, "the" should read -- the full --.

Column 8,
Line 41, "one" should read -- are --;
Line 60, "drag-" should read -- dragging --; and
Line 61, "and-drop" should read -- and-dropping --.

Column 9,
Line 46, "be" should read -- being --.

UNITED STATES PATENT AND TRADEMARK OFFICE
CERTIFICATE OF CORRECTION

PATENT NO.     : 6,507,371 B1
DATED          : January 14, 2003
INVENTOR(S)    : Hashimoto et al.

It is certified that error appears in the above-identified patent and that said Letters Patent is hereby corrected as shown below:

<u>Column 11,</u>
Line 35, "address-generated" should read -- address-generating --.

Signed and Sealed this

Ninth Day of December, 2003

JAMES E. ROGAN
*Director of the United States Patent and Trademark Office*